US012206881B2

(12) United States Patent
Zhao et al.

(10) Patent No.: US 12,206,881 B2
(45) Date of Patent: *Jan. 21, 2025

(54) RANKING TEMPLATES OF A CURRENT BLOCK AND PREDICTION BLOCKS

(71) Applicant: TENCENT AMERICA LLC, Palo Alto, CA (US)

(72) Inventors: Xin Zhao, San Jose, CA (US); Liang Zhao, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,067

(22) Filed: Nov. 15, 2023

(65) Prior Publication Data

US 2024/0107043 A1    Mar. 28, 2024

Related U.S. Application Data

(63) Continuation of application No. 17/489,258, filed on Sep. 29, 2021, now Pat. No. 11,863,774.

(Continued)

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS

2017/0353730 A1    12/2017  Liu et al.
2018/0098086 A1    4/2018   Chuang et al.
(Continued)

FOREIGN PATENT DOCUMENTS

JP    2018-056699 A    4/2018
JP    2019-519148 A    7/2019

OTHER PUBLICATIONS

International Search Report and Written Opinion in PCT/US2021/053395, mailed Jan. 12, 2022, 11 pages.
(Continued)

*Primary Examiner* — Lindsay J Uhl
(74) *Attorney, Agent, or Firm* — ArentFox Schiff LLP

(57) ABSTRACT

Aspects of the disclosure provide methods and apparatuses for video encoding and decoding. The apparatuses include an apparatus for video decoding. Processing circuitry of the apparatus for video decoding can decode coded information for a current block from a coded video bitstream. The coded information indicates a bi-prediction motion compensation mode for the current block. The processing circuitry determines, based on current neighboring reconstructed samples of the current block, first neighboring reconstructed samples of a first prediction block, and second neighboring reconstructed samples of a second prediction block, a weight used in the bi-prediction motion compensation mode. The processing circuitry reconstructs samples in the current block based on a weighted average of corresponding samples in the first prediction block and the second prediction block using the determined weight.

20 Claims, 16 Drawing Sheets

Related U.S. Application Data

(60) Provisional application No. 63/138,201, filed on Jan. 15, 2021.

(51) Int. Cl.
*H04N 19/132* (2014.01)
*H04N 19/159* (2014.01)
*H04N 19/176* (2014.01)

(56) References Cited

U.S. PATENT DOCUMENTS

| | | |
|---|---|---|
| 2018/0184117 A1 | 6/2018 | Chen et al. |
| 2020/0107015 A1 | 4/2020 | Seo et al. |
| 2020/0244979 A1 | 7/2020 | Li et al. |
| 2022/0007048 A1* | 1/2022 | He ............... H04N 19/577 |

OTHER PUBLICATIONS

Office Action in JP2022-559711, mailed Oct. 30, 2023, 5 pages.
Chen et al., "Generalized bi-prediction method for future video coding", 2016 Picture Coding Symposium (PCS), IEEE, XP033086899, Dec. 7, 2016, 5 pages.
Extended European Search Report and Search Opinion received for European Application No. 21920042.5, mailed on Apr. 26, 2023, 10 pages.

* cited by examiner

RANKING TEMPLATES OF A CURRENT BLOCK AND PREDICTION BLOCKS

INCORPORATION BY REFERENCE

The present application is a continuation of U.S. application Ser. No. 17/489,258, "METHOD AND APPARATUS FOR VIDEO CODING" filed on Sep. 29, 2021, which claims the benefit of priority to U.S. Provisional Application No. 63/138,201, entitled "BI-PREDICTION WITH CONTEXT ADAPTIVE WEIGHTS", filed on Jan. 15, 2021, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry can decode coded information for a current block from a coded video bitstream. The coded information can indicate a bi-prediction motion compensation mode for the current block. The processing circuitry can determine, based on current neighboring reconstructed samples of the current block, first neighboring reconstructed samples of a first prediction block, and second neighboring reconstructed samples of a second prediction block, a weight used in the bi-prediction motion compensation mode. The processing circuitry can reconstruct samples in the current block based on a weighted average of corresponding samples in the first prediction block and the second prediction block using the determined weight.

In an embodiment, the weight is one of pre-defined weights stored in the decoder.

In an example, the processing circuitry decodes an index value in the coded information. The processing circuitry can rank the pre-defined weights based on the current neighboring reconstructed samples of the current block, the first neighboring reconstructed samples of the first prediction block, and the second neighboring reconstructed samples of the second prediction block. Each of the ranked pre-defined weights can be associated with a unique ranking index. The decoded index value corresponds to one of the ranking indices. The processing circuitry can determine the weight to be one of the ranked pre-defined weights that is associated with the one of the ranking indices.

In an example, the processing circuitry selects the one of the pre-defined weights to be the weight based on a pre-defined cost measurement performed using the current neighboring reconstructed samples of the current block, the first neighboring reconstructed samples of the first prediction block, and the second neighboring reconstructed samples of the second prediction block.

In an example, the processing circuitry calculates the weight based on the current neighboring reconstructed samples of the current block, the first neighboring reconstructed samples of the first prediction block, and the second neighboring reconstructed samples of the second prediction block.

In an embodiment, the current neighboring reconstructed samples of the current block, the first neighboring reconstructed samples of the first prediction block, and the second neighboring reconstructed samples of the second prediction block are spatial neighboring reconstructed samples of the current block, the first prediction block, and the second prediction block, respectively.

In an example, the first prediction block is in a first reference picture, and the second prediction block is in a second reference picture that is different from the first reference picture.

In some examples, an apparatus for video encoding includes processing circuitry. The processing circuitry for encoding determines a bi-prediction motion compensation mode for coding a current block. Further, the processing circuitry for encoding determines, based on current neighboring reconstructed samples of the current block, first neighboring reconstructed samples of a first prediction block, and second neighboring reconstructed samples of a second prediction block, a weight used in the bi-prediction motion compensation mode. The processing circuitry further encodes information for the current block in a video bitstream. The encoded information indicates the bi-prediction motion compensation mode for the current block.

In an embodiment, the weight is one of pre-defined weights stored in the encoder.

In an example, the processing circuitry for encoding ranks the pre-defined weights based on the current neighboring reconstructed samples of the current block, the first neighboring reconstructed samples of the first prediction block, and the second neighboring reconstructed samples of the second prediction block. Each of the ranked pre-defined weights being associated with a unique ranking index. The processing circuitry for encoding determines the weight to be one of the ranked pre-defined weights and encodes an index value in the encoded information. The index value is one of the ranking indices that is associated with the weight.

In an example, the processing circuitry for encoding selects the one of the pre-defined weights to be the weight based on a pre-defined cost measurement performed using the current neighboring reconstructed samples of the current block, the first neighboring reconstructed samples of the first prediction block, and the second neighboring reconstructed samples of the second prediction block.

In an example, the processing circuitry for encoding calculates the weight based on the current neighboring reconstructed samples of the current block, the first neighboring reconstructed samples of the first prediction block, and the second neighboring reconstructed samples of the second prediction block.

Aspects of the disclosure also provide a non-transitory computer-readable medium storing instructions which when executed by a computer for video decoding and/or encoding cause the computer to perform the method for video decoding and/or encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
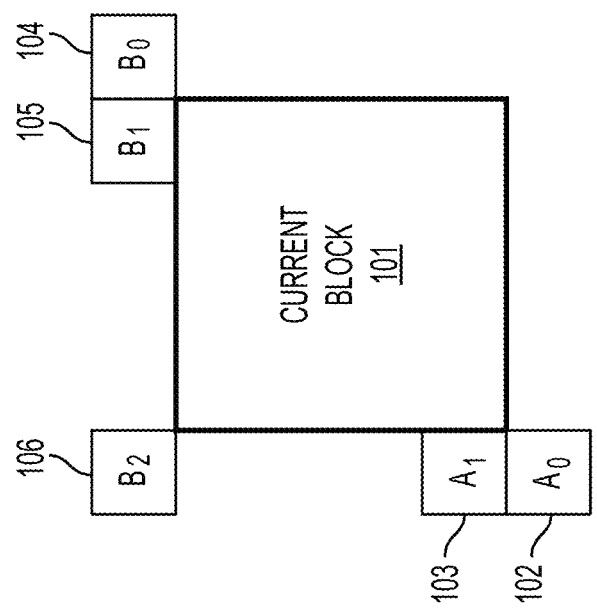
FIG. 1 is a schematic illustration of a current block and its surrounding spatial merge candidates in one example.
Figure 2:
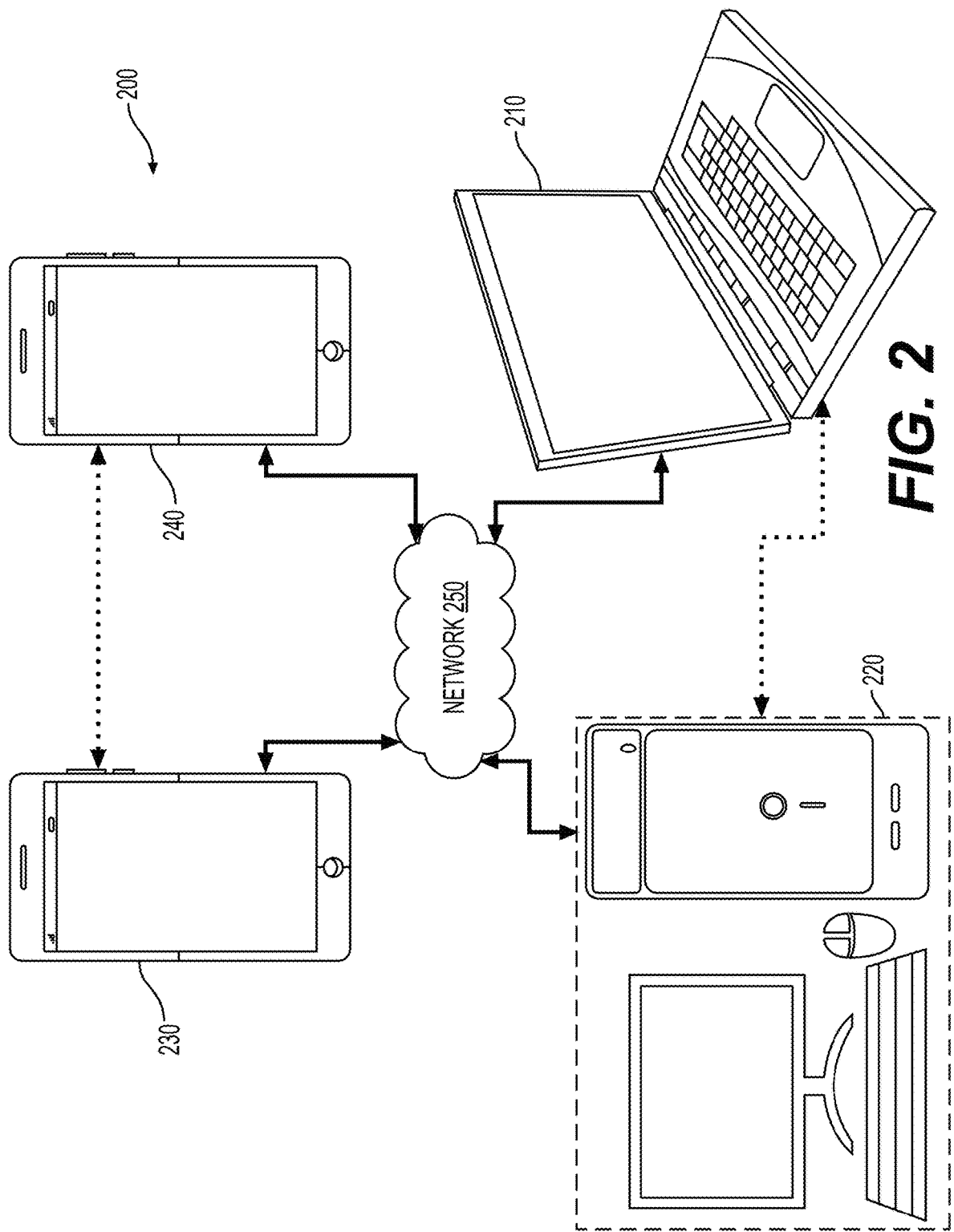
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
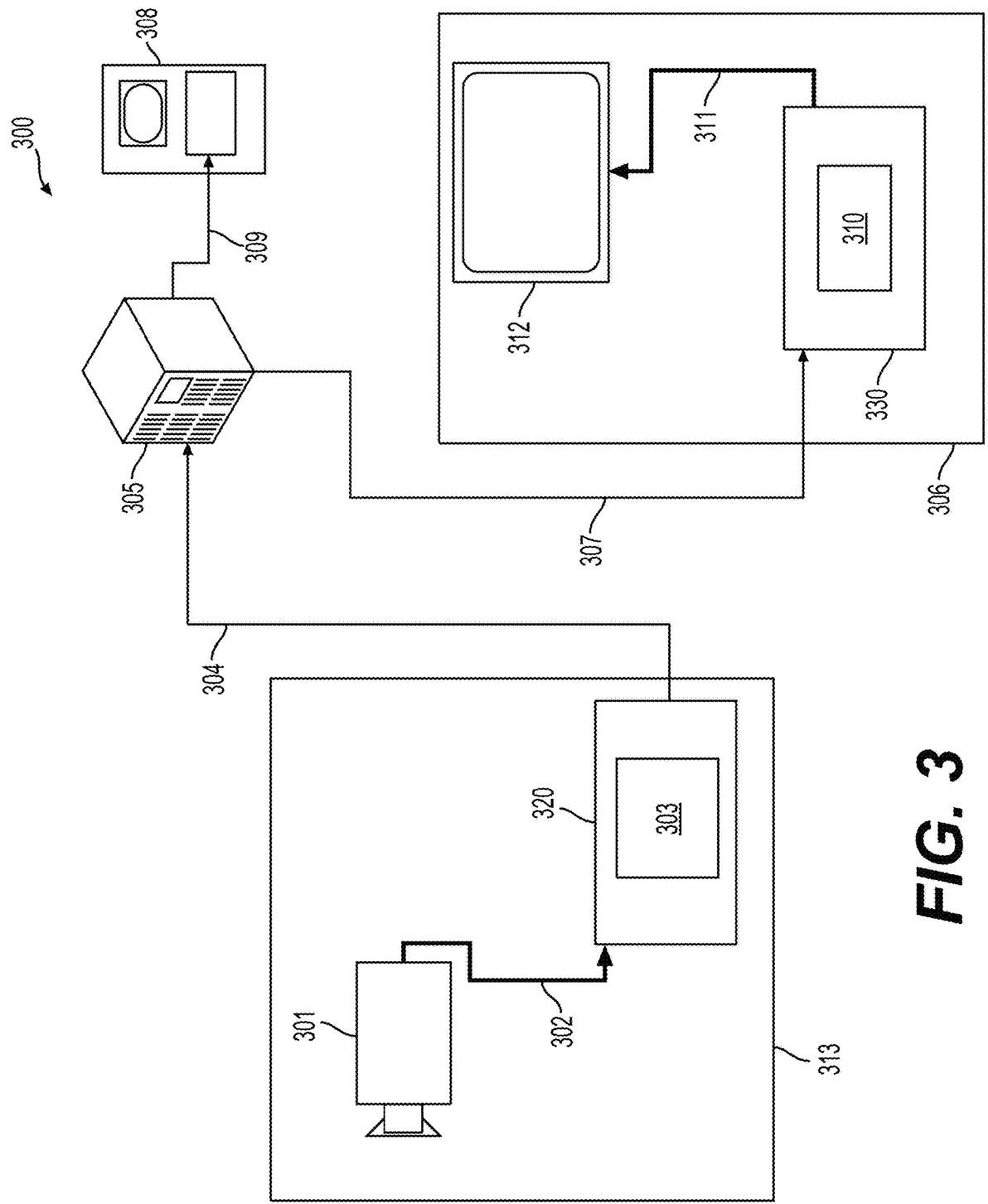
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
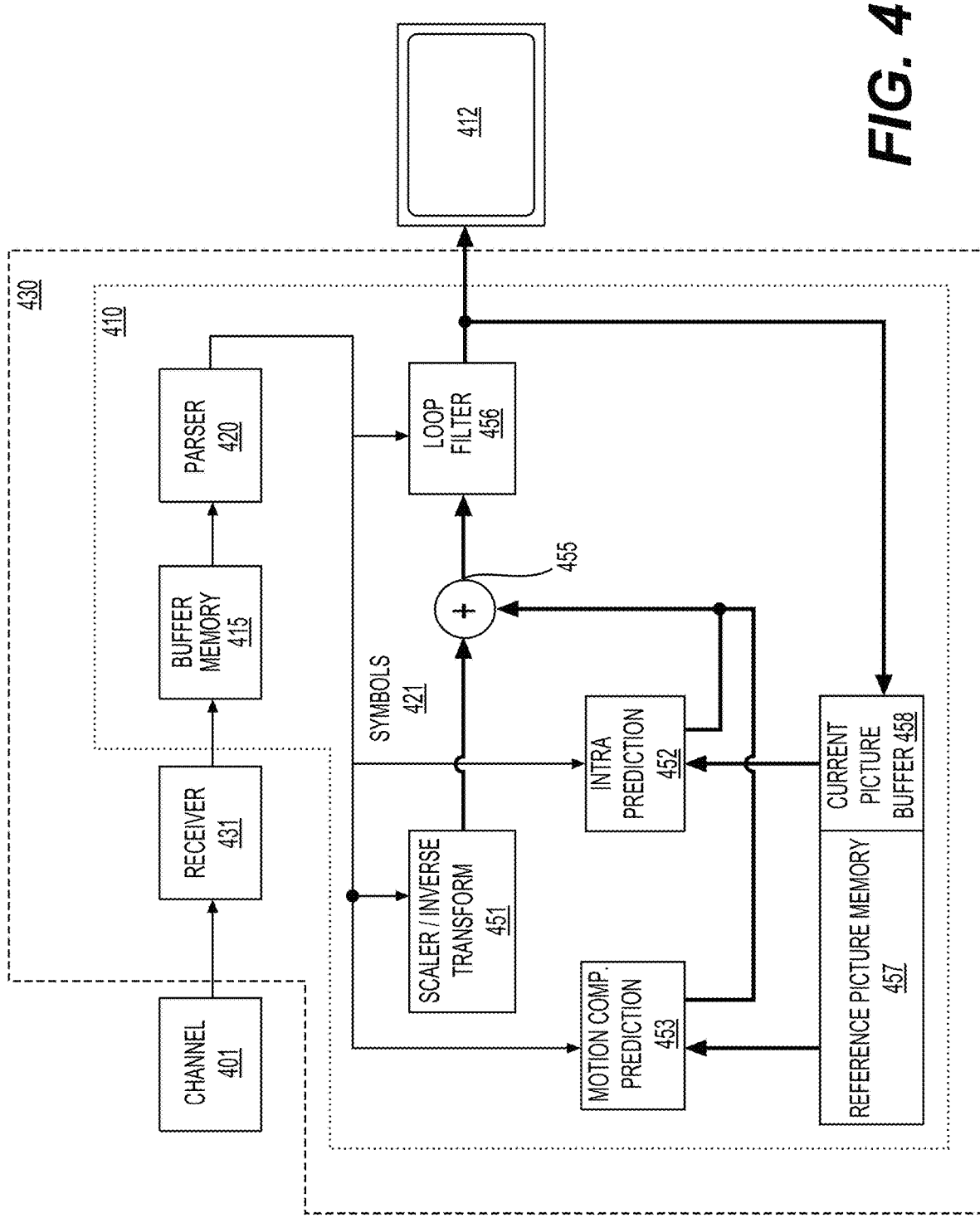
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence is decoded at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
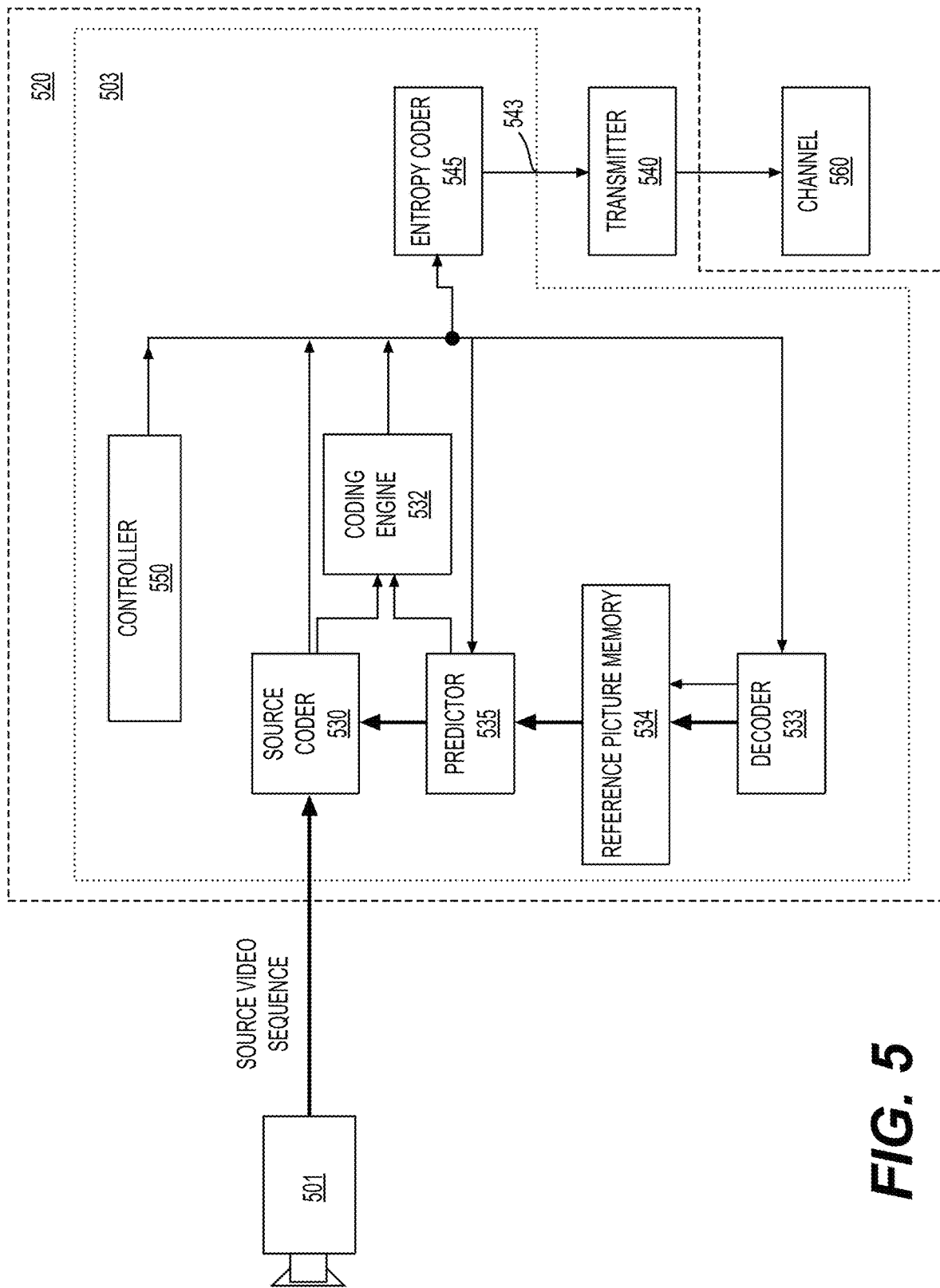
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/ SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
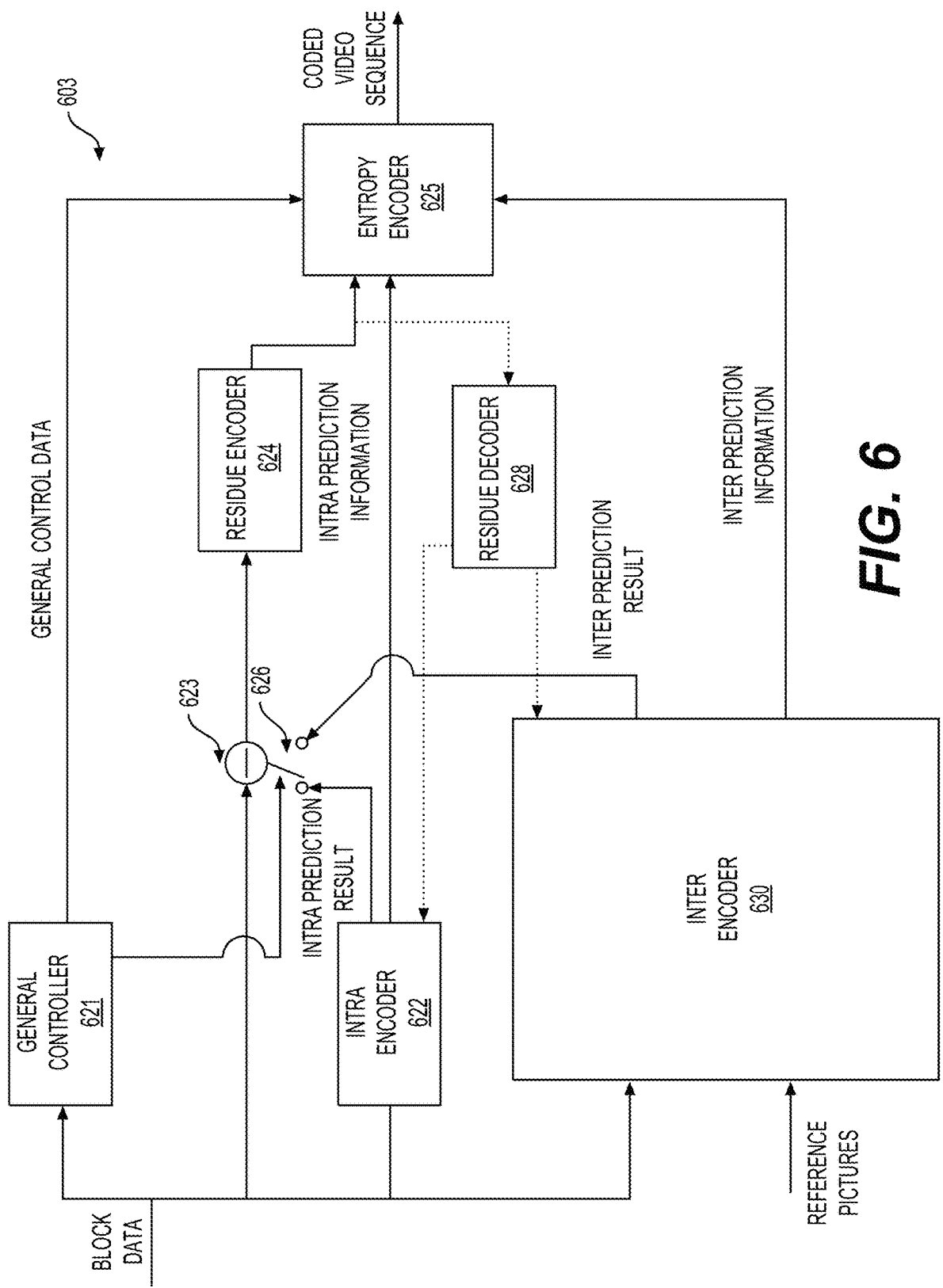
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include in the bitstream various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
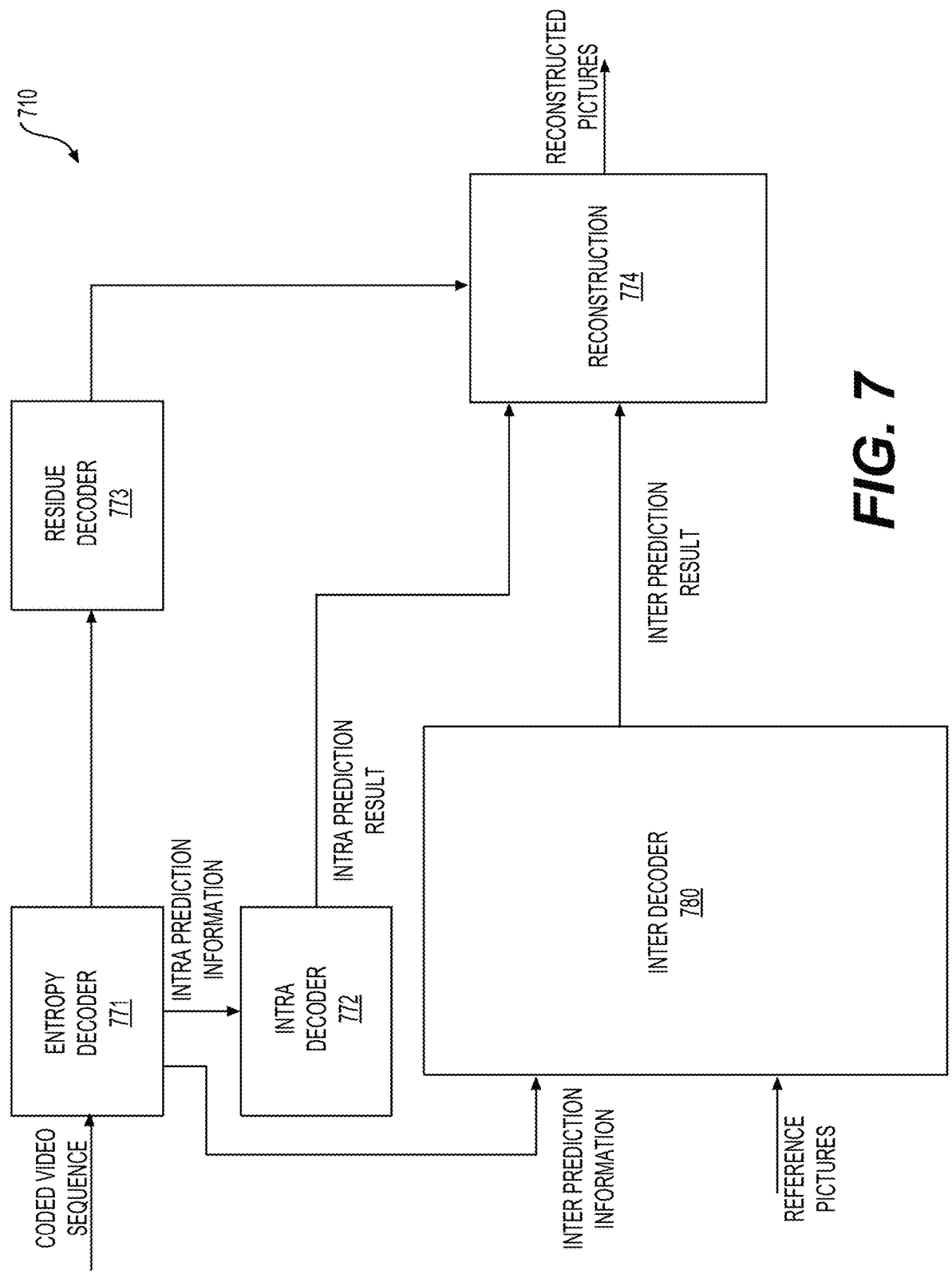
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure disclose image and video coding technologies, such as bi-prediction with context adaptive weights. For example, a bi-prediction method with context adaptive weights can be used in inter coding.

A video coding format can include any suitable video coding format, for example, an open video coding format designed for video transmissions over the Internet, such as a video coding format Alliance for Open Media (AOMedia) Video 1 (AV1) or a next generation AOMedia Video format beyond the AV1. A video coding standard can include High Efficiency Video Coding (HEVC) standard, a next-generation video coding beyond HEVC (e.g., the Versatile Video Coding (VVC)), or the like.

Generally, a picture is partitioned into blocks, and blocks can be units for various processing, such as coding, prediction, transformation, and the like. Various block partition techniques can be used.

Figure 8:
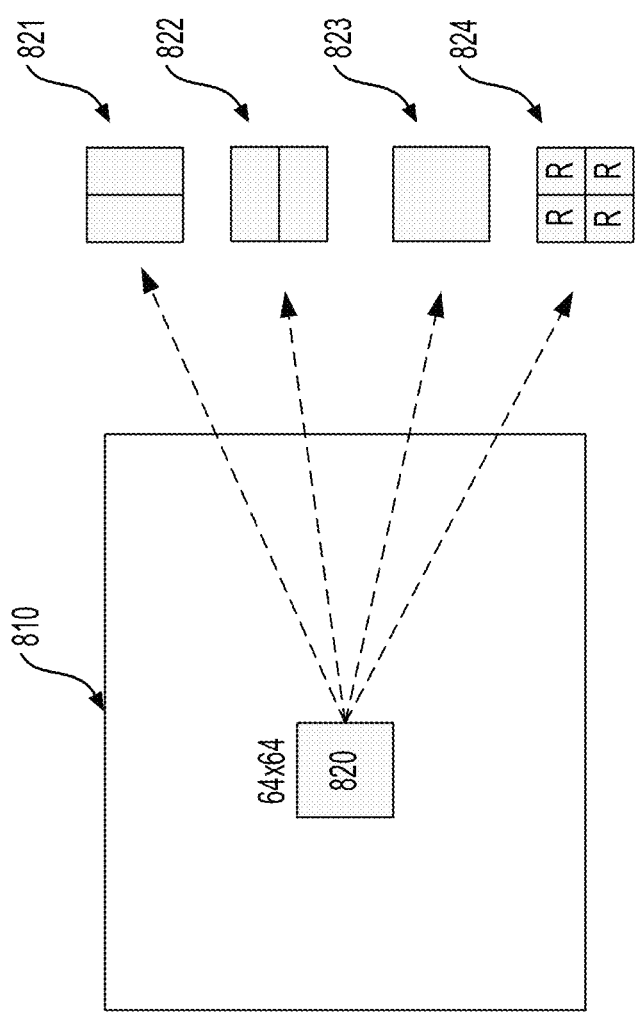
FIG. 8 shows an example of partition techniques used in video coding according to an embodiment of the disclosure.

FIG. 8 shows an example of partition techniques used in a video coding format VP9 by the AOMedia. For example, a picture (810) is partitioned into a plurality of blocks (820) of a size 64×64 (e.g., 64 samples×64 samples). Further, a 4-way partition tree can start from a 64×64 level down to smaller blocks, and a lowest level can be a 4×4 level (e.g., a block size of 4 samples×4 samples). In some examples, additional restrictions can be applied for blocks 8×8 and below. In the FIG. 8 examples, a 64×64 block (820) can be partitioned into smaller blocks using one of a first way (821), a second way (822), a third way (823) and a fourth way (824). A partition designated as R (shown in the fourth way (824)) refers to as a recursive partition in that the same partition tree can be repeated at a lower scale until the lowest 4×4 level.

Figure 9:
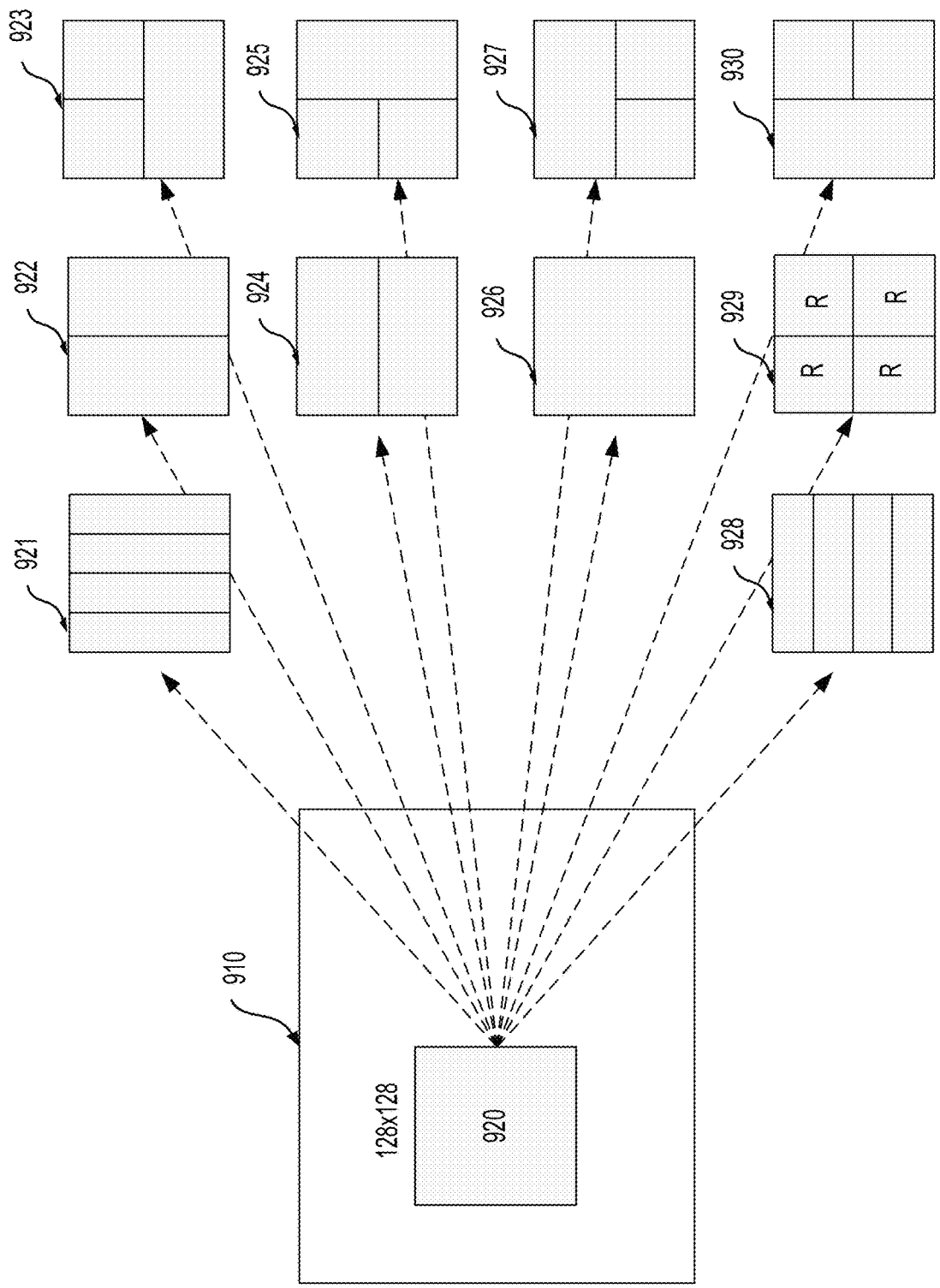
FIG. 9 shows an example of partition techniques used in video coding according to an embodiment of the disclosure.

FIG. 9 shows an example of partition techniques used in AV1 designed for video transmissions over the Internet. AV1 was developed as a successor to VP9. For example, a picture (910) is partitioned into a plurality of blocks (920) of a size 128×128 (e.g., 128 samples×128 samples). Further, a 10-way partition structure can start from 128×128 down to smaller blocks. In the FIG. 9 example, a 128×128 block can be partitioned into smaller blocks using one of ten ways (921)-(930). AV1 not only expands the partition-tree to a 10-way structure, but also increases the largest size (referred to as a superblock in VP9/AV1 parlance) to start from 128×128. A partition designated as R (shown in the way (929)) refers to as a recursive partition in that the same partition tree can be repeated at a lower scale. The 10-way structure can include 4:1 and 1:4 rectangular partitions, such as shown by (921) and (928). In an example, none of the rectangular partitions can be further subdivided. In addition, AV1 adds more flexibility to the use of partitions below an 8×8 level. For example, a 2×2 chroma inter prediction is possible for certain cases.

In some examples, the block partitioning structure is referred to as a coding tree. In an example (e.g., HEVC), the coding tree can have a quad tree structure with each split splitting a larger square block into four smaller square blocks. In some examples, a picture is split into coding tree units (CTUs), and then a CTU is split into smaller blocks using the quad tree structure. According to the quad tree structure, a coding tree unit (CTU) is split into coding units (CUs) to adapt to various local characteristics. A decision on whether to code a picture area using an inter-picture prediction (or an inter prediction) (temporal) or an intra-picture prediction (or an intra prediction) (spatial) can be made at a CU level. Each CU can be further split into one, two, or four prediction units (PUs) according to a PU splitting type. Inside one PU, a same prediction process is applied and relevant information (e.g., prediction information) is transmitted to a decoder on a PU basis.

After obtaining a residual block by applying a prediction process based on the PU splitting type, a CU can be partitioned into transform units (TUs) according to another quad tree structure. In the example of HEVC, there are multiple partition conceptions including CU, PU, and TU. In some embodiments, a CU or a TU can only have a square shape, while a PU may have a square or a rectangular shape. In some embodiments, one coding block may be further split into four square sub-blocks, and transform is performed on each sub-block, e.g., a TU. Each TU can be further split recursively into smaller TUs using a quad tree structure that is called a residual quad tree (RQT).

At a picture boundary, in some examples (e.g., HEVC), an implicit quad tree split can be employed so that a block keeps a quad tree splitting until the size fits the picture boundary.

In some examples (e.g., VVC), a block partitioning structure can use quad tree plus binary tree (QTBT) block partitioning structure. The QTBT structure can remove the concepts of multiple partition types (the CU, PU and TU concepts), and supports more flexibility for CU partition shapes. In the QTBT block partitioning structure, a CU can have either a square or rectangular shape.

Figure 10A:
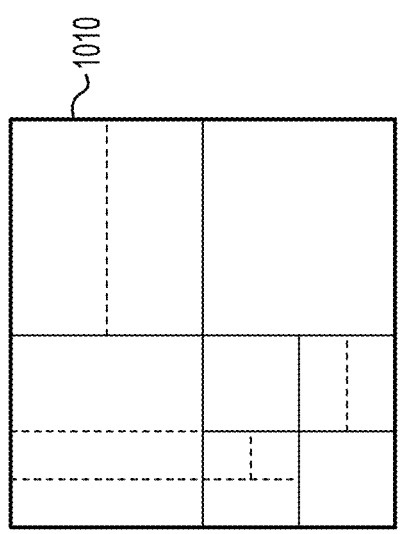
FIGS. 10A-10B show an example of quad tree plus binary tree (QTBT) block partitioning technique according to an embodiment of the disclosure.
Figure 10B:
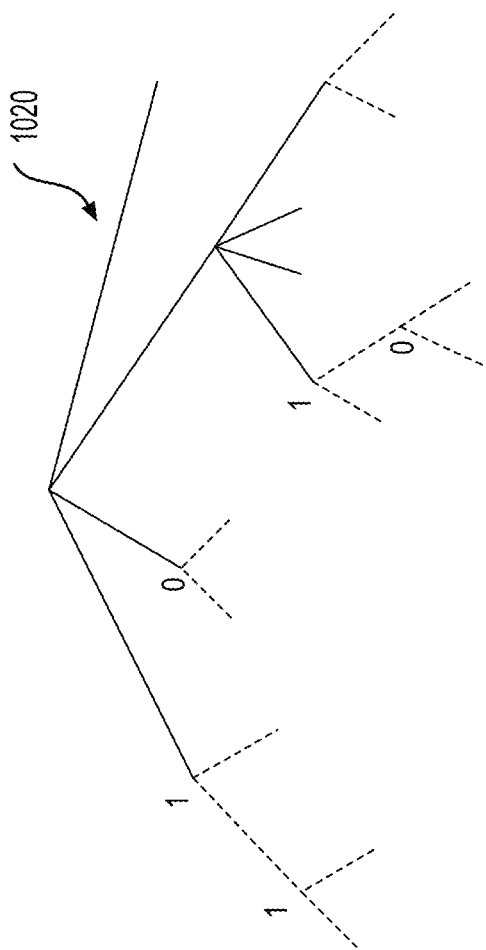

FIG. 10A shows a CTU (1010) that is partitioned by using a QTBT block partitioning structure (1020) shown in FIG. 10B. The CTU (1010) is first partitioned by a quad tree structure. The quad tree leaf nodes are further partitioned by a binary tree structure or a quad tree structure. There can be two splitting types, a symmetric horizontal splitting (e.g., labeled as "0" in the QTBT block partitioning structure (1020)) and a symmetric vertical splitting (e.g., labeled as "1" in the QTBT block partitioning structure (1020)), in the binary tree splitting. The leaf nodes without further splitting are called CUs that can be used for prediction and transform processing without any further partitioning. Accordingly, CU, PU and TU have the same block size in the QTBT block partitioning structure.

In some examples (e.g., JEM), a CU can include coding blocks (CBs) of different color components. For example, one CU contains one luma CB and two chroma CBs in the case of P and B slices of the 4:2:0 chroma format. A CU can include a CB of a single color component. For example, one CU contains only one luma CB or just two chroma CBs in the case of I slices.

The following parameters are defined for the QTBT block partitioning scheme in some embodiments:
  CTU size: the root node size of a quad tree, e.g. the same concept as in HEVC.
  MinQTSize: the minimum allowed quad tree leaf node size.
  MaxBTSize: the maximum allowed binary tree root node size.
  MaxBTDepth: the maximum allowed binary tree depth.
  MinBTSize: the minimum allowed binary tree leaf node size.

In one example of the QTBT block partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quad tree partitioning is applied to the CTU first to generate quad tree leaf nodes. The quad tree leaf nodes may have a size from 16×16 (i.e., the MinQTSize) to 128×128 (i.e., the CTU size). If the leaf quad tree node is 128×128, the leaf quad tree node will not be further split by the binary tree since the size exceeds the MaxBTSize (i.e., 64×64). Otherwise, the leaf quad tree node could be further partitioned by the binary tree. Therefore, the quad tree leaf node is also the root node for the binary tree and it has the binary tree depth as 0.

When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In an embodiment, a maximum CTU size is 256×256 luma samples.

In FIGS. 10A and 10B, the solid lines indicate quad tree splitting and dotted lines indicate binary tree splitting. In each splitting (i.e., non-leaf) node of the binary tree, one flag is signaled to indicate which splitting type (i.e., horizontal or vertical) is used. For example, 0 indicates a horizontal splitting and 1 indicates a vertical splitting. For the quad tree splitting, there is no need to indicate the splitting type since quad tree splitting can split a block both horizontally and vertically to produce 4 sub-blocks with an equal size.

In some embodiments, the QTBT block partitioning scheme supports the flexibility for the luma and chroma to have separate QTBT block partitioning structures. For example, for P and B slices, the luma and chroma blocks in one CTU share the same QTBT block partitioning structure. However, for I slices, the luma CTB is partitioned into CUs by a QTBT block partitioning structure, and the chroma blocks are partitioned into chroma CUs by another QTBT block partitioning structure. Thus, a CU in an I slice consists of a coding block of the luma component or coding blocks of two chroma components, and a CU in a P or B slice consists of coding blocks of all three color components.

In some examples (e.g., HEVC), inter prediction for small blocks is restricted to reduce memory access of motion compensation. For example, bi-prediction is not supported for 4×8 and 8×4 blocks, and inter prediction is not supported for 4×4 blocks.

Further, in some examples (e.g., VCC), a multi-type tree (MTT) block partitioning structure is used. In some examples, the MTT block partitioning structure is a more flexible tree structure than the QTBT block partitioning structure. In MTT, in addition to quad tree partitioning and binary tree partitioning, a ternary tree (TT) partitioning can be used. TT can include a horizontal center-side triple tree partitioning and a vertical center-side triple tree partitioning.

Figure 11B:
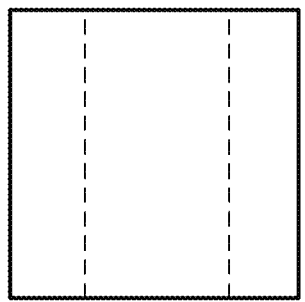
FIGS. 11A-11B show examples of vertical center-side triple tree partitioning and horizontal center-side triple tree partitioning according to embodiments of the disclosure.
Figure 11A:
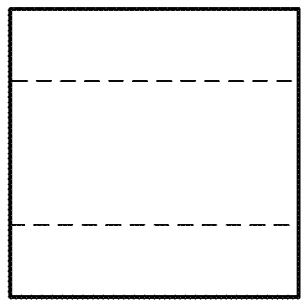

FIG. 11A shows an example of vertical center-side triple tree partitioning and FIG. 11B shows an example of horizontal center-side triple tree partitioning. TT partitioning can complement quad-tree and binary-tree partitioning. For example, triple-tree partitioning can capture objects which locate in a block center, while quad-tree and binary-tree splits crossing block centers. In an example, the width and height of partitions by triple trees are a power of 2 so that no additional transform partition is needed.

The design of block partitioning, such as a two-level tree, is mainly motivated by complexity reduction. The complexity of traversing of a tree can be TD, where T denotes the number of split types, and D is the depth of tree.

A bi-prediction with CU-level weightings (BCW) can be used in inter prediction. In an embodiment, such as in HEVC, a bi-prediction mode refers to an inter prediction mode where a bi-prediction signal is generated by averaging two prediction signals obtained from two different reference pictures and/or using two different motion vectors. In an embodiment, such as in VVC, the bi-prediction mode is extended beyond averaging (with equal weights for the two prediction signals) to allow weighted averaging of the two prediction signals, such as shown in Eq. 1.

$$P_{bi-ped}=((8-w)*P_0+w*P_1+4)>>3 \quad (1)$$

Referring to Eq. 1, the bi-prediction signal $P_{bi-ped}$ is generated by averaging two prediction signals $P_0$ and $P_1$, for example, from two different reference pictures. A weight w can be used to indicate respective weights (8−w) and w for the two prediction signals $P_0$ and $P_1$.

A set of pre-defined weights can be used for the weight w. In an example, five weights are allowed in the weighted averaging bi-prediction, and the weight w can be one of values −2, 3, 4, 5, and 10 (e.g., w∈{−2, 3, 4, 5, 10}). Specifically, equal weighting is used in Eq. 1 when the weight w is 4, and unequal weighting is used in Eq. 1 when the weight is one of −2, 3, 5, and 10.

For each bi-predicted CU, the weight w can be determined in one of two ways: 1) for a non-merge CU, a weight index (e.g., a BCW weight index) can be signaled after a motion vector difference (MVD); 2) for a merge CU, the weight index can be inferred (e.g., inherited) from one or more neighboring blocks based on a merge candidate index.

In an example, the BCW mode is only applied to CUs with 256 or more luma samples (e.g., a CU width multiplied by a CU height is greater than or equal to 256). In an example, for low-delay pictures, all of the five weights (e.g., −2, 3, 4, 5, and 10) are used. In an example, for non-low-delay pictures, only a subset of the five weights are used, such as three weights (e.g., 3, 4, 5 or w∈{3, 4, 5}) are used.

At an encoder, fast search algorithms can be applied to determine a weight index without significantly increasing the encoder complexity. Embodiments of the fast search algorithms can be described as follows.

When combined with an Adaptive Motion Vector Resolution (AMVR) mode, unequal weights (e.g., w being one of −2, 3, 5, and 10 in Eq. 1) are only conditionally checked for 1-pel and 4-pel motion vector precisions if a current picture is a low-delay picture. For example, when the AMVR mode is used and the current picture is a low-delay picture, unequal weights are only applicable for the 1-pel and 4-pel motion vector precisions, and thus can be checked for the 1-pel and 4-pel motion vector precisions. If another motion vector precision (e.g., ½, ¼, or ⅛) is used, the equal weight (e.g., w=4) is used and unequal weights are not checked by the encoder.

In an example, when the BCW mode is combined with an affine mode, affine motion estimation (ME) can be performed for unequal weights if and only if the affine mode is selected as the current best mode.

In an example, when the two reference pictures in the bi-prediction are the same (P0 and P1 are from the same reference picture), unequal weights are only conditionally checked.

In an example, unequal weights are not searched when certain conditions are met, depending on picture order count (POC) distance(s) between the current picture and the corresponding reference picture(s), a coding quantization parameter (QP), and a temporal level (e.g., a time domain layer of the current picture and the corresponding reference picture(s)).

The weight index can be coded using one context coded bin (also referred to as a first context coded bin) followed by additional bin(s) (also referred to as bypass coded bin(s)). The first context coded bin can indicate if an equal weight (e.g., w=4) is used. If an unequal weight is used, the additional bin(s) can be signaled using bypass coding to indicate which unequal weight is used.

In some examples, such as AVC, HEVC, VVC, and the like, a weighted prediction (WP) is used as a coding tool. WP can be used to efficiently code video content with fading. Weighting parameters including a weight and an offset used in WP can be signaled for each reference picture in each of the reference picture lists I0 and Li. During motion compensation, the weight(s) and offset(s) of the corresponding reference picture(s) can be applied.

In some examples, according to WP, the inter prediction signal P is replaced by a linear weighted prediction signal P' (with a weight w' and offset o), for example according to Eq. 2 for uni-prediction:

$$\text{Uni-prediction: } P'=w'\times P+o \quad \text{Eq. 2}$$

In an example, for bi-prediction, an inter prediction signal P0 is for a reference L0, a weight w0 and an offset o0 are for the reference U), and an inter prediction signal P1 is for a reference L1, a weight w1 and an offset o1 are for the reference L0, then the linear weighted prediction signal P' can be calculated according to Eq. 3:

$$\text{Bi-prediction: } P'=(w0\times P0+o0+w1\times P1+o1)/2 \quad \text{Eq. 3}$$

In some examples, WP and BCW are designed for different types of video content. In order to avoid interactions between WP and BCW, which may complicate certain decoder designs, such as a VVC decoder design, if a CU uses WP, then a weight index used in BCW is not signaled, and a weight w can be inferred to be 4 (i.e. equal weight is applied). In an example, if one of WP and BCW is applied to a block, the other of WP and BCW is not applied to the block.

For a merge CU, for example, predicted using a normal merge mode or an inherited affine merge mode, the BCW weight index can be inferred from neighboring blocks based on a merge candidate index. For a CU predicted using a constructed affine merge mode, the affine motion information can be constructed based on the motion information of up to three blocks. The BCW weight index for the CU using the constructed affine merge mode can be set equal to the BCW weight index of a first control point MV.

In an example, such as in VVC, a Combined Intra-Inter Prediction (CIIP) mode and the BCW mode cannot be jointly applied for a CU. When a CU is coded with the CIIP mode, the BCW weight index of a current CU can be set to a value (e.g., 2) that indicates an equal weight.

In some embodiments, a technique referred to as local illumination compensation (LIC) can be used in video coding. LIC is based on a linear model for illumination changes, using parameters, such as a scaling factor denoted by "a" and an offset denoted by "b". LIC can be enabled or disabled adaptively for each inter-mode coded coding unit (CU).

In an embodiment, when LIC is applied to a CU, the scaling factor "a" and the offset "b" can be derived using a least square error method based on the neighboring samples of the current CU and the corresponding reference samples.

Figure 12:
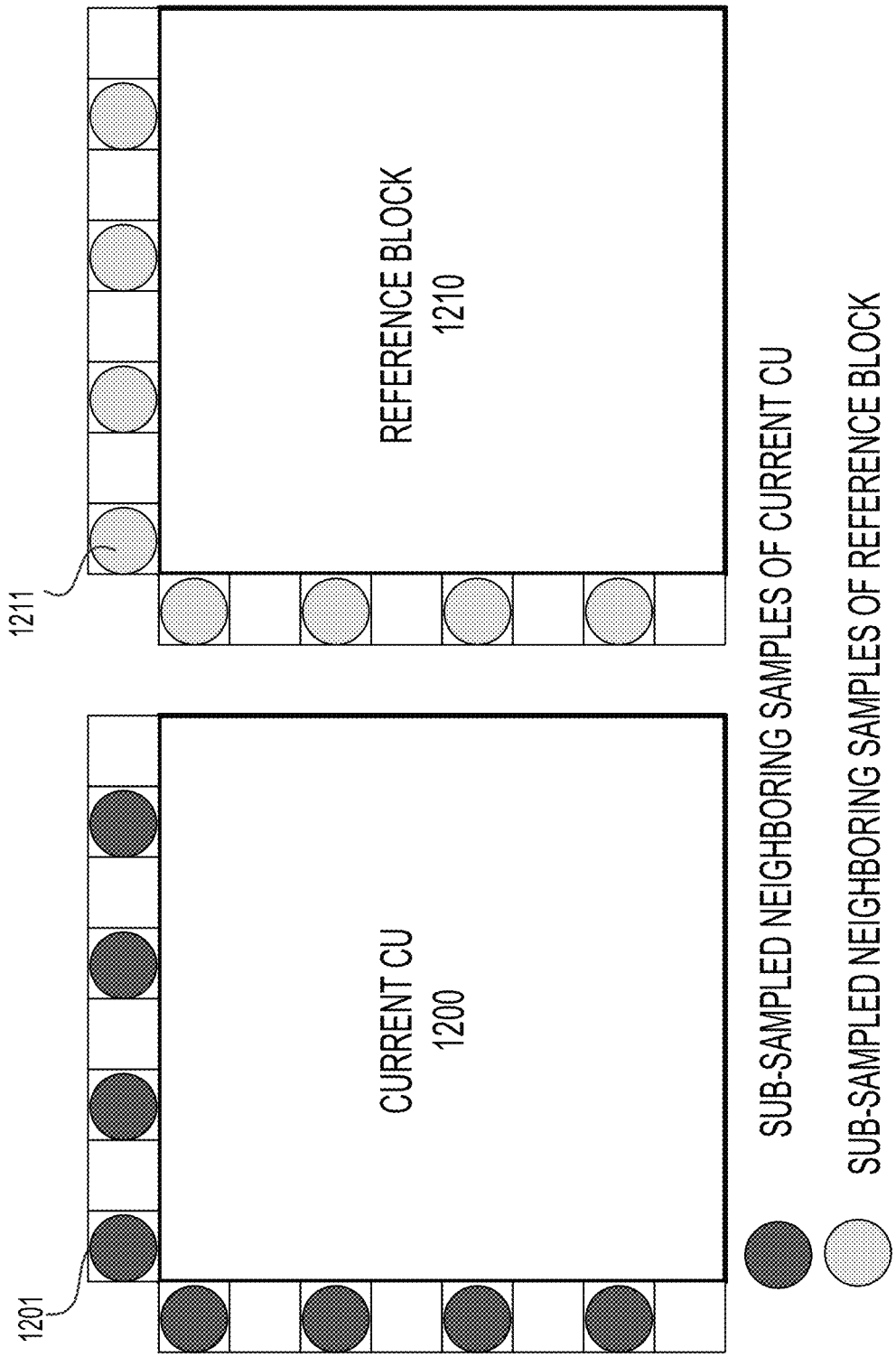
FIG. 12 shows a diagram of neighboring samples of a current CU and a reference block for the current CU according to an embodiment of the disclosure.

FIG. 12 shows a diagram of neighboring samples of a current CU (1200) and a reference block (1210) for the current CU (1200). In the FIG. 12 example, neighboring samples of the current CU (1200) and the reference block (1210) are sub-sampled, for example, using 2:1 subsampling. In an example, the subsampled (e.g., 2:1 subsampling) neighboring samples of the current CU (1200) and the corresponding samples in the reference picture that are identified by motion information of the current CU (1200) or sub-CU are used.

The illumination compensation (IC) parameters (e.g., the scaling factor "a" and the offset "b") can be derived and applied for each prediction direction separately.

In an example, when a current CU is coded with the merge mode, an LIC flag is copied from neighboring block(s), in a way similar to copying motion information in the merge mode. In another example, an LIC flag is signaled for the CU to indicate whether to apply LIC or not.

In some embodiments, when LIC is enabled for a picture, an additional CU level rate distortion (RD) check is performed to determine whether to apply LIC to a CU or not. When LIC is enabled for a CU, a mean-removed sum of absolute difference (MR-SAD) and a mean-removed sum of absolute Hadamard-transformed difference (MR-SATD) can be used, instead of a sum of absolute difference (SAD) and a sum of absolute Hadamard-transformed difference (SATD), for integer pixel based motion search and fractional pixel based motion search, respectively.

To reduce the encoding complexity, in an example, such as in JEM, the following encoding scheme is applied. LIC can be disabled for an entire picture when there is no obvious illumination change between a current picture and corresponding reference picture(s). To identify the above situation, histograms of the current picture and each reference picture of the current picture can be calculated at the encoder. If a respective histogram difference between the current picture and every reference picture of the current picture is smaller than a threshold (e.g., a pre-defined threshold), LIC is disabled for the current picture. Otherwise, LIC is enabled for the current picture.

In some examples, such as in the BCW mode, the weight (s) (also referred to as weighting values) (e.g., w and/or (8-w) in Eq. 1) applied to the two prediction blocks are either signaled explicitly or inherited from neighboring blocks (e.g., spatial neighboring block(s) and/or temporal neighboring block(s)). On the other hand, since the weight(s) (e.g., w and/or (8-w) in Eq. 1) reflect a linear relationship between a current block and prediction blocks (e.g., a forward prediction block and a backward prediction block), neighboring reconstructed samples (also referred to as reconstruction samples) of the current block and the prediction blocks can be correlated with similar weight(s). Therefore, the neighboring reconstruction samples of the current block and the prediction blocks may be used to determine (e.g., estimate) the weights, for example, to save the signaling overhead.

In the present disclosure, a prediction block can also be referred to as a reference block, and prediction blocks (or reference blocks) for a current block under reconstruction can include a first prediction block (or a first reference block) in a first reference picture and a second prediction block (or a second reference block) in a second reference picture. The current block is in a current picture. The current picture is different from the first reference picture and the current picture is different from the second reference picture. The first reference picture can be different from or identical to the second reference picture. In some examples, one of the first prediction block and the second prediction block is a forward prediction block, and the other one of the first prediction block and the second prediction block is a backward prediction block. In some examples, the first prediction block and the second prediction block are forward prediction blocks. In some examples, the first prediction block and the second prediction block are backward prediction blocks.

Neighboring reconstructed samples of the current block, the first prediction block (e.g., a forward or a backward prediction block) of the current block, and the second prediction block (e.g., a forward or a backward prediction block) of the current block can be referred to as a template (or a current template of the current block, a template (or a first template) of the first prediction block, a template (or a second template) of the second prediction block, respectively.

Figure 13:
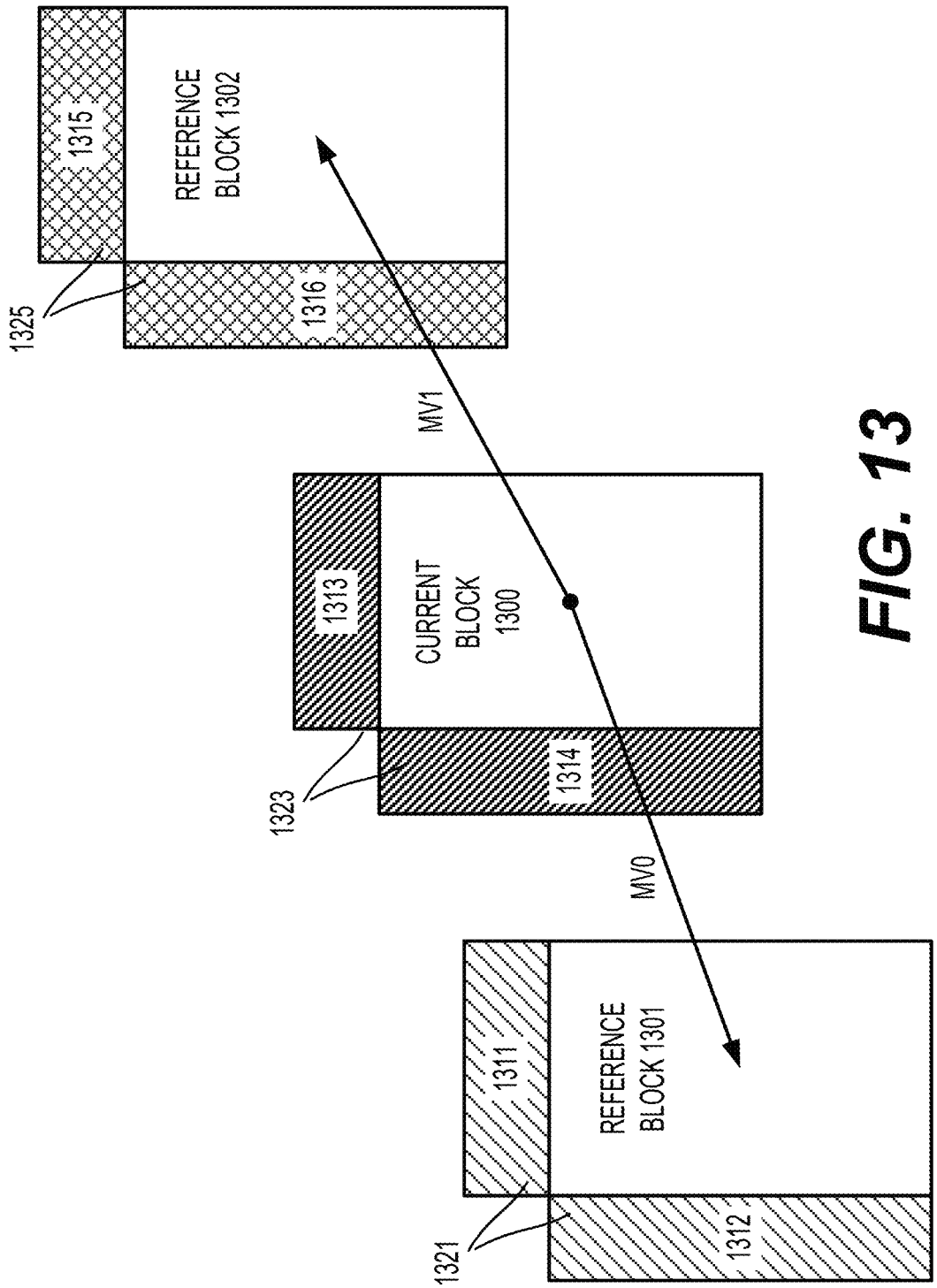
FIG. 13 shows examples of templates of a current block and prediction blocks according to an embodiment of the disclosure.

FIG. 13 shows examples of templates of a current block (1300) and prediction blocks (or reference blocks) (1301)-(1302) according to an embodiment of the disclosure. A template (1323) of the current block (1300) includes neighboring reconstructed samples of the current block (1300), such as the neighboring reconstructed samples in top row(s) (1313) and left column(s) (1314) of the current block (1300) that are above and to the left of the current block (1300), respectively. A template (1321) of the first reference block (1301) and a template (1325) of the second reference block (1302) correspond to the template (1323) of the current block (1300). Specifically, in the example shown in FIG. 13, the template (1321) includes neighboring reconstructed samples of the first reference block (1301), such as the neighboring reconstructed samples in top row(s) (1311) and left column(s) (1312) of the first reference block (1301) that are above and to the left of the first reference block (1301), respectively. The template (1325) includes neighboring reconstructed samples of the second reference block (1302), such as the neighboring reconstructed samples in top row(s) (1315) and left column(s) (1316) of the second reference block (1302) that are above and to the left of the second reference block (1302), respectively. A first motion vector (MV) (MV0) points to the first reference block (1301) in a first reference picture, and the second MV (MV1) points to the second reference block (1302) in a second reference picture. MV0 can be referred to as a forward MV if the first reference picture is a forward reference picture and the first reference block (1301) is a forward prediction block. MV0 can be referred to as a backward MV if the first reference picture is a backward reference picture and the first reference block (1301) is a backward prediction block. MV1 can be a forward MV or a backward MV depending on the second prediction block (1302) or the second reference picture, similar as described with reference to MV0.

FIG. 13 shows templates that include top row(s) and left column(s) of the current block and the prediction blocks. A template of a block, such as the current block or one of the prediction blocks, can include any suitable neighboring reconstructed samples of the block. According to aspects of the disclosure, the template of the block can include any suitable spatial neighboring reconstructed samples of the block. The template of the block can include top-left sample (s) that are above and to the left of the block, top row(s) above the block, left column(s) to the left of the block, and/or neighboring reconstructed sample(s) in other suitable locations with respect to the block. The template of the block can include neighboring reconstructed sample(s) that are adjacent to the block and/or neighboring reconstructed sample(s) that are not adjacent to the block.

According to aspects of the disclosure, shapes of the templates (1323), (1321), and (1325) of the current block (1300), the first reference block (1301), and the second reference block (1302), respectively, can be identical. Relative positions of the templates (1323), (1321), and (1325) with respect to the corresponding current block (1300), the first reference block (1301), and the second reference block (1302) can be identical. A number of neighboring reconstructed samples in each of the templates (1321), (1323), and (1325) can be identical. For example, the template (1323) includes the top row (1313) and the left column (1314) that are adjacent to the current block (1300), the template (1321) includes the top row (1311) and the left column (1312) that are adjacent to the first reference block (1301), and the template (1325) includes the top row (1315) and the left column (1316) that are adjacent to the second reference block (1302).

When a bi-prediction motion compensation mode is applied to predict a current block, such as described in Eq.

1, samples (e.g., sample values being represented by a bi-prediction signal $P_{bi-pred}$) in the current block can be predicted based on a weighted average of corresponding samples in a first prediction block (e.g., sample values being represented by a prediction signal $P_0$) and a second prediction block (e.g., sample values being represented by a prediction signal $P_1$). According to aspects of the disclosure, a weight (e.g., the weight w in Eq. 1) used in the bi-prediction motion compensation mode can be determined based on current neighboring reconstructed samples (or a current template) of the current block, first neighboring reconstructed samples (or a first template) of a first prediction block, and/or second neighboring reconstructed samples (or a second template) of a second prediction block. Referring to FIG. 13, the weight used in the bi-prediction motion compensation mode can be determined based on the current neighboring reconstructed samples of the current block (e.g., the template (1323)), the first neighboring reconstructed samples of the first prediction block (e.g., the template (1321) of the first reference block (1301)), and/or the second neighboring reconstructed samples of the second prediction block (e.g., the template (1325) of the second reference block (1302)).

In an example, the entire current template of the current block, the entire first template of the first prediction block, and/or the entire second template of the second prediction block are used in determining the weight. In an example, a subset of samples in the current template of the current block, a subset of samples in the first template of the first prediction block, and/or a subset of samples in the second template of the second prediction block are used in determining the weight.

According to aspects of the disclosure, a first weight (e.g., (8-w) in Eq. 1) for the first prediction block and a second weight (e.g., w in Eq. 1) for the second prediction block are used in the bi-prediction motion compensation mode to predict the current block (e.g., using Eq. 1). In general, when the weight used in the bi-prediction motion compensation mode is determined, the first weight and the second weight can be determined based on a relationship between the weight and the first weight and/or a relationship between the weight and the second weight. The first weight and the second weight can be dependent on each other, for example, a sum of the first weight and the second weight is a constant. Accordingly, when the first weight or the second weight is determined, the other weight is also determined based on a relationship between the first weight and the second weight. In an example, the weight used in the bi-prediction motion compensation mode is the first weight. Thus, when the weight is determined, the second weight is also determined. In an example, the weight used in the bi-prediction motion compensation mode is the second weight. Thus, when the weight is determined, the first weight is also determined.

According to aspects of the disclosure, the weight (e.g., the weight w in Eq. 1) used in the bi-prediction motion compensation mode can be determined based on the current neighboring reconstructed samples of the current block, the first neighboring reconstructed samples of the first prediction block, and the second neighboring reconstructed samples of the second prediction block.

Further, samples in the current block can be reconstructed based on the weighted average of the corresponding samples in the first prediction block and the second prediction block using the determined weight.

The weights (or weighting values) applied to the prediction blocks (e.g., the forward and/or backward prediction blocks) in the bi-prediction motion compensation mode can depend on the neighboring reconstructed samples of, including but not limited to, the current block, the first prediction block, and/or the second prediction block.

In an embodiment, the neighboring reconstructed samples (or the current template) of the current block and the neighboring reconstructed samples (or the first template and/or the second template) of the prediction blocks (e.g., the forward and/or backward prediction blocks) are used to derive an index value associated with each of pre-defined weights (or weighting values), for example, stored in an encoder and/or a decoder.

In an embodiment, at the encoder and the decoder, a group of weights (or weighting values) can be pre-defined and is referred to as the pre-defined weights. The group of weights can be ranked based on the current template of the current block, the first template of the first prediction block, and/or the second template of the second prediction block. In an example, the group of weights is ranked based on the current template of the current block, the first template of the first prediction block, and the second template of the second prediction block. A ranking index (e.g., an index value) at an encoder side can be associated with each weight based on the ranking, and thus the ranking index at the encoder side can be associated with each of the ranked pre-defined weights. The weight to be used in the bi-prediction motion compensation mode can be selected based on the ranking. Then at the encoder, the corresponding ranking index (e.g., the index value) associated with the selected weight can be signaled in a video bitstream. For example, the pre-defined weights include five different weights a0, b0, c0, d0, and e0. Based on the current template, the first template, and the second template, the pre-defined weights can be ranked into the ranked pre-defined weights d0, a0, b0, e0, and c0 that are associated with ranking indices 0, 1, 2, 3, and 4. The encoder can determine, for example, based on the ranking that the weight d0 associated with the ranking index 0 is to be used in the bi-prediction motion compensation mode. Then at the encoder, the ranking index 0 is signaled in the video bitstream.

At the decoder, a ranking process that is identical to that in the encoder can be performed to the pre-defined weights. Specifically, the pre-defined weights stored in the decoder can be ranked based on the current template of the current block, the first template of the first prediction block, and/or the second template of the second prediction block. A ranking index (e.g., an index value) at a decoder side can be associated with each weight based on the ranking, and thus the ranking index at the decoder side can be associated with each of the ranked pre-defined weights. The coded index value in the video bitstream can be decoded. The weight associated with the decoded index value can be determined or derived based on the ranking indices at the decoder side and the associated ranked pre-defined weights. Subsequently, the determined weight can be used in the bi-prediction motion compensation mode. For example, the pre-defined weights include five different weights a0, b0, c0, d0, and e0. Based on the current template, the first template, and the second template, the pre-defined weights can be ranked into the ranked pre-defined weights d0, a0, b0, e0, and c0 that are associated with ranking indices 0, 1, 2, 3, and 4. As the decoded index value 0 is associated with the weight d0. The decoder can determine that the weight d0 associated with the ranking index 0 is to be used in the bi-prediction motion compensation mode. Then at the decoder, the determined weight d0 is used in the bi-prediction motion compensation mode. In an example, the first weight and/or the second weight are determined based on the determined weight d0 and further used to predict the current block.

In general, a set of weights for the first prediction block and the second prediction block, such as a first weight (8−w) for the first prediction block and a second weight w for the second prediction block used in Eq. 1 are dependent on each other. Thus, the set of weights can be determined based on the first weight or the second weight. In an embodiment, at both the encoder and the decoder, the first weight and/or the second weight can be selected from the group of pre-defined weights based on a pre-defined cost measurement. The pre-defined cost measurement can be performed (e.g., calculated) using the current template of current block, the first template of the first prediction block, and/or the second template of the second prediction block. In an embodiment, the selected weight(s) (e.g., the first weight and/or the second weight) is not signaled in the video bitstream. The selected weight(s) can be used in the bi-prediction motion compensation mode. Referring to Eq. 1, when the first weight or the second weight is determined or selected based on the pre-defined cost measurement, the other weight is also determined based on the relationship between the first weight and the second weight. Thus, the set of weights for the first prediction block and the second prediction block, such as the weight (8−w) for the first prediction block and the weight w for the second prediction block can be determined.

In an embodiment, at both the encoder and the decoder, the first weight and/or the second weight can be directly calculated using the current template of the current block, the first template of the first prediction block, and/or the second template of the second prediction block. In an example, the first weight and/or the second weight are directly calculated using the current template of the current block, the first template of the first prediction block, and the second template of the second prediction block In an example, the first weight and/or the second weight are derived using least mean-square error based on the current template of the current block, the first template of the first prediction block, and/or the second template of the second prediction block. Specifically, vectors $\vec{x}$, $\vec{y}$ and $\vec{z}$ are used to represent the neighboring reconstructed samples in the first template, the second template, and the current template, respectively. To find the best weights a and (1−a) that are applied to the first reference block and the second reference block for generating the predicted block for the current block, the following cost is minimized $$D = \sum_{i=0}^{N-1} (a \cdot x_i + (1-a) \cdot y_i - z_i)^2 \qquad \text{Eq. 4}$$

where N is a total number of samples in each of the first template, the second template, and the current template. The solution is given as follows $$a = \frac{\sum_{i=0}^{N-1}(z_i - y_i)(x_i - y_i)}{\sum_{i=0}^{N-1}(x_i - y_i)^2} \qquad \text{Eq. 5}$$

Accordingly, the first weight a and the second weight (1−a) can be obtained based on Eq. 5.

In an example, the first weight and/or the second weight are derived using least mean-square error based on the current template of the current block, the first template of the first prediction block, and/or the second template of the second prediction block. The vectors $\vec{x}$, $\vec{y}$ and $\vec{z}$ are used to represent the neighboring reconstructed samples in the first template, the second template, and the current template, respectively. To find the best weights a and (1−a) that are applied to the first reference block and the second reference block for generating the predicted block for the current block, the following cost is minimized $$D = \sum_{i=0}^{N-1}(a \cdot x_i + (1-a) \cdot y_i + b - z_i)^2 \qquad \text{Eq. 6}$$

The solution is given as follows $$\begin{bmatrix} a \\ b \end{bmatrix} = (M^T M)^{-1} M^T \vec{n} \qquad \text{Eq. 7}$$

$$\text{where } M = \begin{bmatrix} x_0 - y_0 & 1 \\ \ldots & \ldots \\ x_{N-1} - y_{N-1} & 1 \end{bmatrix}, \vec{n} = \begin{bmatrix} z_0 - y_0 & 1 \\ \ldots & \ldots \\ z_{N-1} - y_{N-1} & 1 \end{bmatrix},$$

and the parameter b is a constant indicating an offset. Accordingly, the first weight a and the second weight (1−a) can be obtained based on Eqs. 6-7.

In an embodiment, if a MV for one of the reference blocks points to a fractional position in a reference picture, neighboring reconstructed samples of the reference block can be generated using another MV (referred to as a template generating MV) having a different MV resolution (or precision), such as a integer MV resolution. Referring to FIG. 13, if the first MV (MV0) for the first reference block (1301) points to a fractional position in the first reference picture, the neighboring reconstructed samples in the template (1321) are generated using a first template generating MV having a different MV resolution from that of the first MV. If the second MV (MV1) for the second reference block (1302) points to a fractional position in the second reference picture, the neighboring reconstructed samples in the template (1325) are generated using a second template generating MV having a different MV resolution from that of the second MV.

In an embodiment, a template generating MV specifying a corresponding template for deriving the weight(s) used in the bi-prediction motion compensation mode can have a lower MV resolution than or an equal MV resolution to a MV resolution of a MV pointing from the current block to a corresponding reference block. For example, the first template generating MV specifying the first template can have a lower MV resolution than or an equal MV resolution to the MV resolution of the first MV pointing from the current block to the first prediction block. The second template generating MV specifying the second template can have a lower MV resolution than or an equal MV resolution to the MV resolution of the second MV pointing from the current block to the second prediction block. In an example, the MV resolution of the first MV (or the second MV) is ⅛ pel precision or 1/16 pel precision, and the MV resolution of the first template generating MV associated with the first template (or the second template generating MV associated with the second template) is ¼ pel precision, ½ pel precision, or an integer-pel (1-pel) precision.

In an embodiment, the MV(s) specifying the neighboring samples for deriving the weight(s) used in the bi-prediction motion compensation mode, such as the first template generating MV associated with the first template and/or the second template generating MV associated with the second template, have the integer-pel resolution.

In an embodiment, the MV(s) specifying the neighboring samples for deriving the weight(s) used in the bi-prediction motion compensation mode, such as the first template generating MV associated with the first template and/or the second template generating MV associated with the second template, can have either the integer-pel (1-pel) resolution or the half-pel (½) resolution.

In an embodiment, the MV(s) specifying the neighboring samples for deriving the weight(s) used in the bi-prediction motion compensation mode, such as the first template generating MV associated with the first template and/or the second template generating MV associated with the second template, can be either the integer-, the half-pel, or the quarter-pel resolution.

In an embodiment, the MV(s) specifying the neighboring samples for deriving the weight(s) used in the bi-prediction motion compensation mode, such as the first template generating MV associated with the first template and/or the second template generating MV associated with the second template, can be derived by rounding the first MV and/or the second MV to a pre-defined MV resolution. Examples of the pre-defined MV resolution can include, but are not limited to, a four-pel MV resolution, a two-pel MV resolution, the integer-pel MV resolution, the half-pel MV resolution, the quarter-pel MV resolution, and the ⅛-pel MV resolution.

According to aspects of the disclosure, for the current block predicted using the bi-prediction motion compensation mode, the set of weights used in the bi-prediction motion compensation mode can be (i) derived using the neighboring reconstructed samples of the current block, the first reference block, and/or the second reference block, such as described in the present disclosure; (ii) explicitly signaled as used, for example, in the BCW mode for a block not coded by the merge mode, or (iii) inherited from neighboring blocks of the current block as used, for example, in the BCW mode for a block coded by the merge mode. The selection among the above three methods (i)-(iii) can be signaled for the current block.

In an example, the selection between the methods (i) and (ii) is signaled for the current block.

In an example, the selection between the methods (i) and (ii) is signaled for the current block that is not coded by the merge mode.

In an example, the selection between the methods (i) and (iii) is signaled for the current block.

In an example, the selection between the methods (i) and (iii) is signaled for the current block that is coded by the merge mode.

Figure 14:
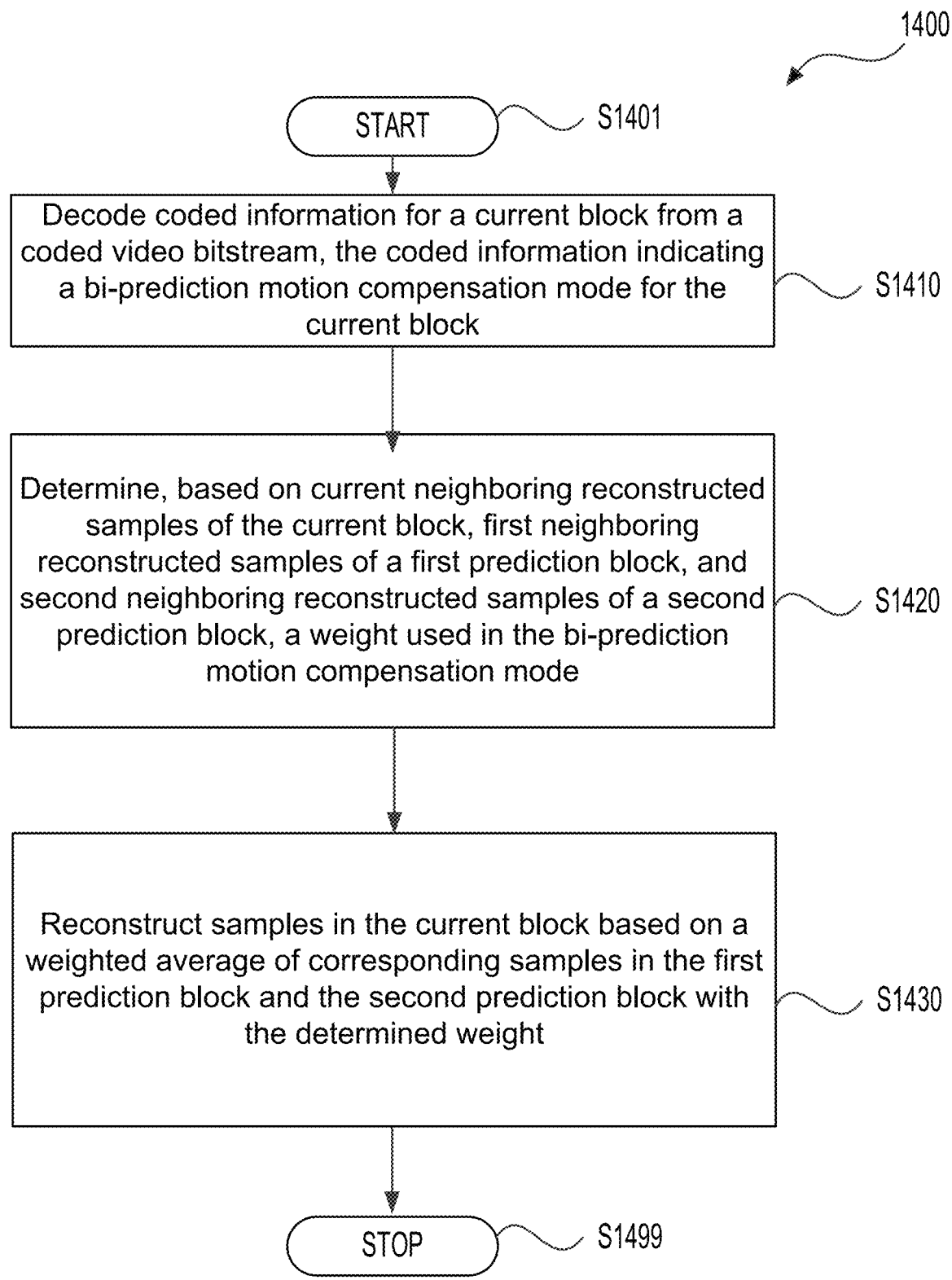
FIG. 14 shows a flow chart outlining a process according to an embodiment of the disclosure.

FIG. 14 shows a flow chart outlining a process (1400) according to an embodiment of the disclosure. The process (1400) can be used in the reconstruction of a block, so to generate a prediction block for the block under reconstruction. The block can be any suitable block, such as a CB, a CU, a PB, a TB, a TU, a luma block, a chroma block, or the like. In various embodiments, the process (1400) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1400) is implemented in software instructions, thus when the processing circuitry executes the software instructions, the processing circuitry performs the process (1400). The process starts at (S1401) and proceeds to (S1410).

At (S1410), coded information for a current block can be decoded from a coded video bitstream. The coded information can indicate a bi-prediction motion compensation mode for the current block. Based on the bi-prediction motion compensation mode, samples in the current block can be predicted based on a weighted average of samples in two prediction blocks of the current block. The two prediction blocks can include a first prediction block having a first weight and a second prediction block having a second weight.

In an example, the current neighboring reconstructed samples of the current block, the first neighboring reconstructed samples of the first prediction block, and the second neighboring reconstructed samples of the second prediction block are spatial neighboring reconstructed samples of the current block, the first prediction block, and the second prediction block, respectively.

The first prediction block can be in a first reference picture, and the second prediction block can be in a second reference picture. In an example, the second reference picture is different from the first reference picture. In an example, the first reference picture is identical to the second reference picture.

In an example, an index value in the coded information is decoded.

At (S1420), based on current neighboring reconstructed samples (or a current template) of the current block, first neighboring reconstructed samples (or a first template) of the first prediction block, and second neighboring reconstructed samples (or a second template) of the second prediction block, a weight (e.g., the first weight, the second weight, or a parameter that can indicate the first weight and the second weight) used in the bi-prediction motion compensation mode can be determined.

In an embodiment, the weight is one of pre-defined weights stored in the decoder.

In an example, the pre-defined weights can be ranked based on the current neighboring reconstructed samples of the current block, the first neighboring reconstructed samples of the first prediction block, and the second neighboring reconstructed samples of the second prediction block. Each of the ranked pre-defined weights can be associated with a unique ranking index. The decoded index value can correspond to one of the ranking indices. Further, the weight can be determined to be one of the ranked pre-defined weights that is associated with the one of the ranking indices.

In an example, the one of the pre-defined weights can be selected to be the weight based on a pre-defined cost measurement performed using the current neighboring reconstructed samples of the current block, the first neighboring reconstructed samples of the first prediction block, and the second neighboring reconstructed samples of the second prediction block.

In an example, the weight is calculated based on the current neighboring reconstructed samples of the current block, the first neighboring reconstructed samples of the first prediction block, and the second neighboring reconstructed samples of the second prediction block, such as described using Eqs. 4-7.

At (S1430), samples in the current block can be reconstructed based on the weighted average of the corresponding samples in the first prediction block and the second prediction block using the determined weight. The process (1400) proceeds to (S1499), and terminates.

Figure 15:
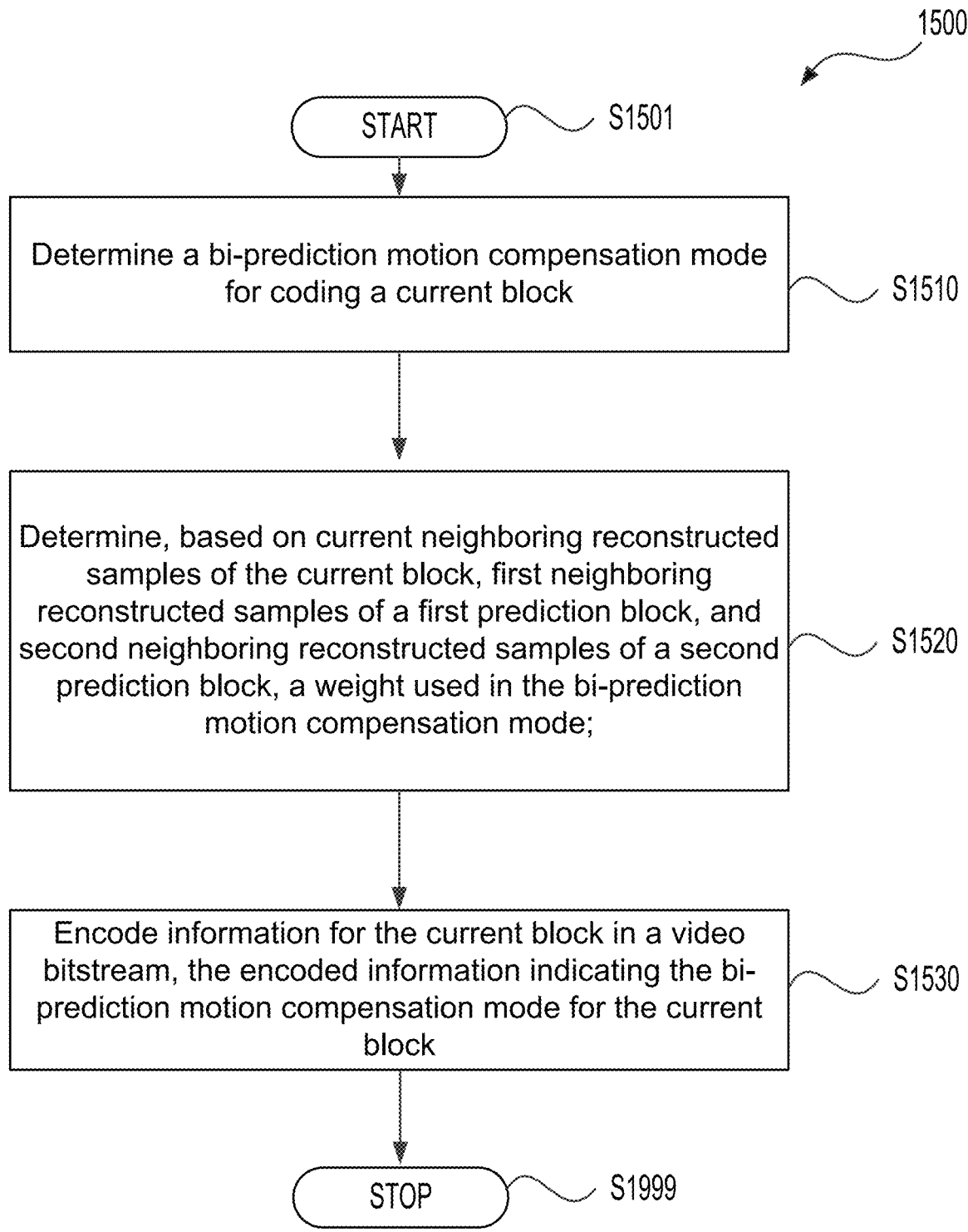
FIG. 15 shows a flow chart outlining a process according to an embodiment of the disclosure.

FIG. 15 shows a flow chart outlining a process (1500) according to an embodiment of the disclosure. The process (1500) can be used in encoding a block. The block can be any suitable block, such as a CB, a CU, a PB, a TB, a TU, a luma block, a chroma block, or the like. In various embodiments, the process (1500) are executed by processing circuitry, such as the processing circuitry in the terminal devices (210), (220), (230) and (240), the processing circuitry that performs functions of the video encoder (303, the processing circuitry that performs functions of the video encoder (503), and the like. In some embodiments, the process (1500) is implemented in software instructions, thus when the processing circuitry executes the software instructions, the processing circuitry performs the process (1500). The process starts at (S1501) and proceeds to (S1510).

At (S1510), a bi-prediction motion compensation mode for coding a current block can be determining by the encoder.

At (S1520), a weight used in the bi-prediction motion compensation mode can be determined based on current neighboring reconstructed samples of the current block, first neighboring reconstructed samples of a first prediction block, and second neighboring reconstructed samples of a second prediction block.

In an example, the current neighboring reconstructed samples of the current block, the first neighboring reconstructed samples of the first prediction block, and the second neighboring reconstructed samples of the second prediction block are spatial neighboring reconstructed samples of the current block, the first prediction block, and the second prediction block, respectively.

The first prediction block can be in a first reference picture, and the second prediction block can be in a second reference picture. In an example, the second reference picture is different from the first reference picture. In an example, the first reference picture is identical to the second reference picture.

In an example, the weight is calculated based on the current neighboring reconstructed samples of the current block, the first neighboring reconstructed samples of the first prediction block, and the second neighboring reconstructed samples of the second prediction block.

In an embodiment, the weight is one of pre-defined weights stored in the encoder.

In an example, the pre-defined weights is ranked based on the current neighboring reconstructed samples of the current block, the first neighboring reconstructed samples of the first prediction block, and the second neighboring reconstructed samples of the second prediction block. Each of the ranked pre-defined weights can be associated with a unique ranking index. The weight can be determined to be one of the ranked pre-defined weights.

In an example, the one of the pre-defined weights can be selected to be the weight based on a pre-defined cost measurement performed using the current neighboring reconstructed samples of the current block, the first neighboring reconstructed samples of the first prediction block, and the second neighboring reconstructed samples of the second prediction block.

At (S1530), information for the current block can be encoded in a video bitstream. The encoded information can indicate the bi-prediction motion compensation mode for the current block.

In an example, an index value is encoded in the encoded information where the index value can be one of the ranking indices that is associated with the weight. The process (1500) proceeds to (S1599), and terminates.

The process (1400) and/or the process (1500) can be suitably adapted. Step(s) in the process (1400) and/or the process (1500) can be modified and/or omitted. Additional step(s) can be added. Any suitable order of implementation can be used. In an example, the embodiments are extended to a weighted prediction including more than two prediction blocks. For example, samples in the current block can be predicted based on a weighted average of samples in M prediction blocks of the current block where M is an integer larger than 2. Each of the M prediction blocks can have a weight. The weights of the M prediction blocks can be determined using any suitable methods described in the present disclosure.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
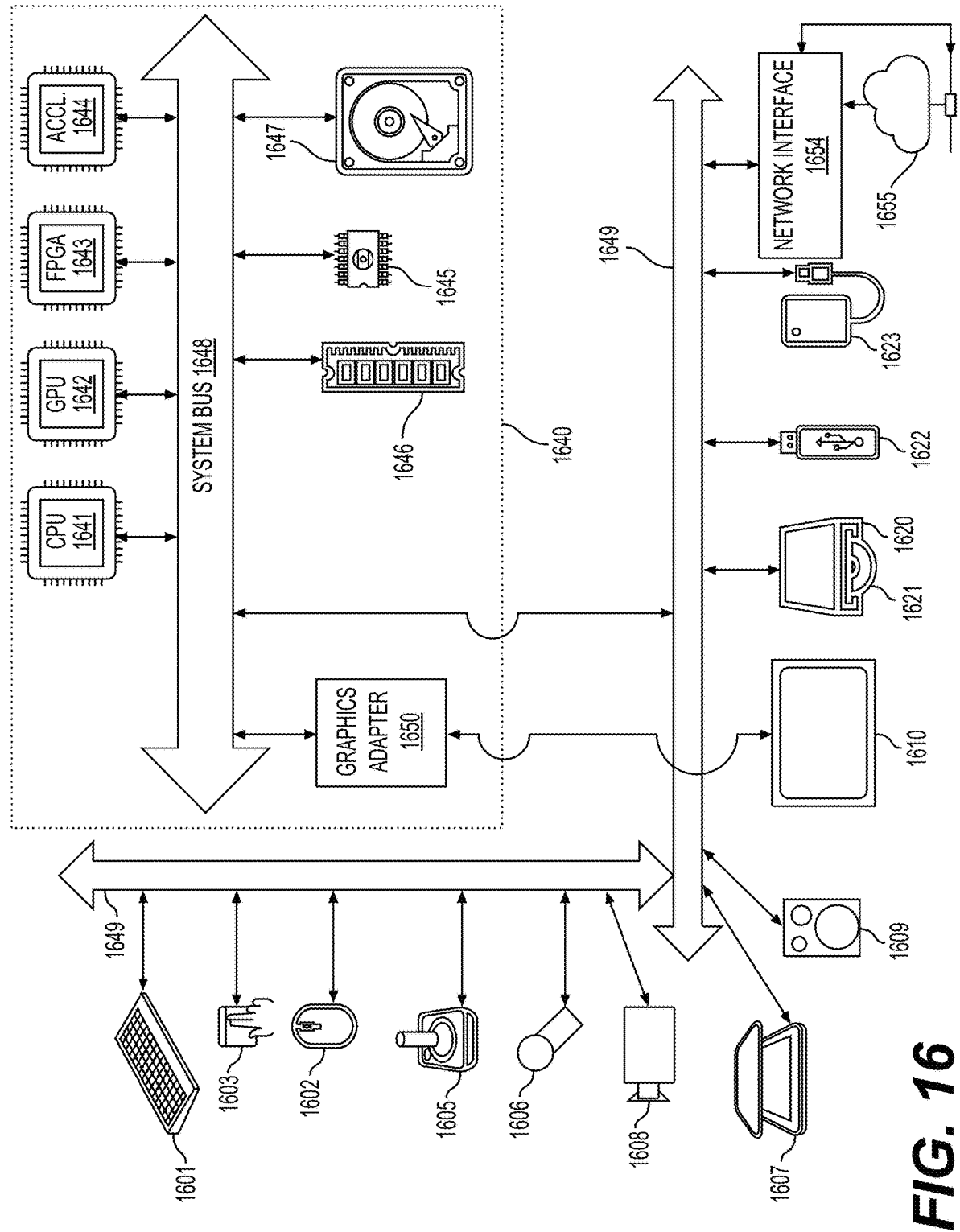
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapters (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, the screen (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units, PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding in an encoder, comprising:
    determining that a current block is to be encoded in a bi-prediction motion compensation mode;
    ranking, based on current neighboring reconstructed samples of the current block, first neighboring reconstructed samples of a first prediction block, and second neighboring reconstructed samples of a second prediction block, plural pre-defined weights used in the bi-prediction motion compensation mode;
    selecting one of the plural pre-defined weights and indicating the selected weight by an index included in coded information of the current block; and
    encoding samples in the current block based on a weighted average of corresponding samples in the first prediction block and the second prediction block using the selected weight.

2. The method of claim 1, wherein the pre-defined weights are stored in the encoder.

3. The method of claim 2, wherein
    the encoding further includes encoding the index in the coded information of the current block;
    each of the ranked pre-defined weights being associated with a unique ranking index, the encoded index corresponding to one of the ranking indices; and
    the selected weight is one of the ranked pre-defined weights that is associated with the one of the ranking indices.

4. The method of claim 1, wherein the pre-defined weights include a first weight representing an equal weighting between the first prediction block and the second prediction block and include at least one second weight representing an unequal weighting between the first prediction block and the second prediction block.

5. The method of claim 1, wherein the ranking includes ranking a subset of the plural pre-defined weights when a current picture of the current block is a low-delay picture.

6. The method of claim 1, wherein the current neighboring reconstructed samples of the current block, the first neighboring reconstructed samples of the first prediction block, and the second neighboring reconstructed samples of the second prediction block are spatial neighboring reconstructed samples of the current block, the first prediction block, and the second prediction block, respectively.

7. The method of claim 1, wherein the first prediction block is in a first reference picture, and the second prediction block is in a second reference picture that is different from the first reference picture.

8. A method of processing visual media data, the method comprising:
    performing a conversion between a visual media file and a bitstream of visual media data according to a format rule,
    wherein the bitstream indicates that a current block is coded in a bi-prediction motion compensation mode,
    wherein the bitstream further includes an index that indicates a selected weight among plural pre-defined weights used in the bi-prediction motion compensation mode, and
    wherein the format rule specifies that the plural pre-defined weights are ranked, based on current neighboring reconstructed samples of the current block, first neighboring reconstructed samples of a first prediction block, and second neighboring reconstructed samples of a second prediction block such that the index in the bitstream is based on a result of the ranking.

9. The method of claim 8, wherein the pre-defined weights are stored in at least one of an encoder and a decoder.

10. The method of claim 9, wherein
    each of the ranked pre-defined weights being associated with a unique ranking index, the index in the bitstream corresponding to one of the ranking indices; and
    the selected weight is one of the ranked pre-defined weights that is associated with the one of the ranking indices.

11. The method of claim 8, wherein the pre-defined weights include a first weight representing an equal weighting between the first prediction block and the second prediction block and include at least one second weight representing an unequal weighting between the first prediction block and the second prediction block.

12. The method of claim 8, wherein the ranking includes ranking a subset of the plural pre-defined weights when a current picture of the current block is a low-delay picture.

13. The method of claim 8, wherein the current neighboring reconstructed samples of the current block, the first neighboring reconstructed samples of the first prediction block, and the second neighboring reconstructed samples of the second prediction block are spatial neighboring reconstructed samples of the current block, the first prediction block, and the second prediction block, respectively.

14. An encoder apparatus, comprising:
    processing circuitry configured to:
        determining that a current block is to be encoded in a bi-prediction motion compensation mode;
        rank, based on current neighboring reconstructed samples of the current block, first neighboring reconstructed samples of a first prediction block, and second neighboring reconstructed samples of a second prediction block, plural pre-defined weights used in the bi-prediction motion compensation mode;

select one of the plural pre-defined weights and indicate the selected weight by an index included in coded information of the current block; and encode samples in the current block based on a weighted average of corresponding samples in the first prediction block and the second prediction block using the selected weight.

15. The apparatus of claim 14, wherein the pre-defined weights are stored in the encoder apparatus.

16. The apparatus of claim 15, wherein the processing circuitry is configured to:

encode the index in the coded information of the current block; wherein each of the ranked pre-defined weights being associated with a unique ranking index, the encoded index corresponding to one of the ranking indices; and the selected weight is one of the ranked pre-defined weights that is associated with the one of the ranking indices.

17. The apparatus of claim 14, wherein the pre-defined weights include a first weight representing an equal weighting between the first prediction block and the second prediction block and include at least one second weight representing an unequal weighting between the first prediction block and the second prediction block.

18. The apparatus of claim 14, wherein the ranking includes ranking a subset of the plural pre-defined weights when a current picture of the current block is a low-delay picture.

19. The apparatus of claim 14, wherein the current neighboring reconstructed samples of the current block, the first neighboring reconstructed samples of the first prediction block, and the second neighboring reconstructed samples of the second prediction block are spatial neighboring reconstructed samples of the current block, the first prediction block, and the second prediction block, respectively.

20. The apparatus of claim 14, wherein the first prediction block is in a first reference picture, and the second prediction block is in a second reference picture that is different from the first reference picture.

* * * * *